United States Patent
Higbe

(10) Patent No.: US 9,457,823 B2
(45) Date of Patent: Oct. 4, 2016

(54) BUCKET TRANSPORT STRUCTURE

(71) Applicant: William A. Higbe, Prosperity, SC (US)

(72) Inventor: William A. Higbe, Prosperity, SC (US)

( * ) Notice: Subject to any disclaimer, the term of this patent is extended or adjusted under 35 U.S.C. 154(b) by 0 days.

(21) Appl. No.: 14/492,453

(22) Filed: Sep. 22, 2014

(65) Prior Publication Data

US 2016/0082995 A1 Mar. 24, 2016

(51) Int. Cl.
*B62B 7/02* (2006.01)
*B62B 1/26* (2006.01)
*B62B 1/22* (2006.01)

(52) U.S. Cl.
CPC ............ *B62B 1/264* (2013.01); *B62B 1/22* (2013.01); *B62B 2202/028* (2013.01)

(58) Field of Classification Search
CPC ............... B62B 2202/028; B62B 2202/50; B62B 1/264; B62B 3/02; B62B 3/10; B62B 3/104; B62B 5/0083; B62B 1/18; B62B 1/22; B62B 1/26; B62B 1/10; B62B 1/12; B62B 1/202; B44D 3/14; B25H 1/02; B25H 1/04; B25H 1/12
See application file for complete search history.

(56) References Cited

U.S. PATENT DOCUMENTS

| | | | | |
|---|---|---|---|---|
| 355,263 A * | 12/1886 | Gourlay | ...................... | 414/450 |
| 1,479,223 A * | 1/1924 | Carroll | ...................... | 280/47.18 |
| 2,351,292 A * | 6/1944 | Rose | ........................... | 280/47.24 |
| 2,723,864 A * | 11/1955 | Schierman | ................. | 280/47.24 |
| 2,840,384 A * | 6/1958 | Bard | ........................ | 280/47.371 |
| 2,855,210 A | 10/1958 | Joyce | | |
| 3,292,795 A | 12/1966 | Chappell | | |
| 4,319,761 A * | 3/1982 | Wells | ........................ | 280/47.36 |
| 5,149,125 A * | 9/1992 | Gray | ............................. | 280/651 |
| 5,163,694 A * | 11/1992 | Reichek | ...................... | 280/47.26 |
| 5,183,280 A * | 2/1993 | Gresch | ........................ | 280/79.5 |
| 5,190,303 A * | 3/1993 | Schumacher et al. | .......... | 280/38 |
| 5,190,351 A * | 3/1993 | Klumpjan | ......................... | 298/3 |
| 5,607,174 A * | 3/1997 | Ambrogio | ..................... | 280/653 |
| 5,791,667 A | 8/1998 | Knoll | | |
| 5,806,867 A * | 9/1998 | Hampton | .................... | 280/47.34 |
| 6,027,128 A * | 2/2000 | Stich et al. | ................ | 280/47.16 |
| 6,116,625 A * | 9/2000 | Tesch | ......................... | 280/79.11 |
| 6,164,212 A * | 12/2000 | Haggard | ........................ | 108/25 |
| 6,185,917 B1 * | 2/2001 | Goudes | .......................... | 56/12.8 |
| 6,203,033 B1 | 3/2001 | Knoll | | |
| 6,209,891 B1 * | 4/2001 | Herrmann | .................... | 280/32.6 |
| RE37,350 E * | 9/2001 | Stephan | ...................... | 280/79.5 |
| 6,315,310 B1 * | 11/2001 | Hurt | .............................. | 280/79.5 |
| 6,454,281 B1 * | 9/2002 | Pearson | ...................... | 280/47.26 |
| 6,695,325 B2 * | 2/2004 | Carrillo | ....................... | 280/47.34 |
| 7,128,325 B1 * | 10/2006 | Garston | ........................... | 280/38 |
| 8,069,939 B1 * | 12/2011 | Metzler | ........................ | 180/19.3 |
| 8,381,931 B1 * | 2/2013 | Ernest, III | ................. | 220/23.88 |
| 8,534,681 B2 * | 9/2013 | Tomsha | ...................... | 280/47.19 |
| 2008/0185802 A1 * | 8/2008 | Fleming | ...................... | 280/47.18 |
| 2009/0206569 A1 * | 8/2009 | Begin et al. | ............... | 280/47.35 |
| 2009/0302563 A1 * | 12/2009 | Thibault | .................... | 280/47.34 |
| 2010/0230920 A1 * | 9/2010 | Thibault | ..................... | 280/79.11 |
| 2013/0334797 A1 * | 12/2013 | Umbro et al. | ................ | 280/654 |

* cited by examiner

*Primary Examiner* — Hau Phan
(74) *Attorney, Agent, or Firm* — Southeast IP Group, LLC.; Thomas L. Moses; Randolph J. Tucker

(57) ABSTRACT

A bucket transport structure for the transport of buckets includes a platform defining holes therein to receive buckets, and includes a frame having a wheel and handles. The platform is removably connected on one end adjacent the handle, and is also removably connected to the frame adjacent the wheel. The platform is preferably supported at an angle when the wheelbarrow frame is at rest so that the platform is in a generally horizontal orientation when the bucket transport structure is being utilized for transporting buckets. A series of platforms may be interchangeably attachable to the frame, wherein each platform includes a different number of holes.

9 Claims, 4 Drawing Sheets

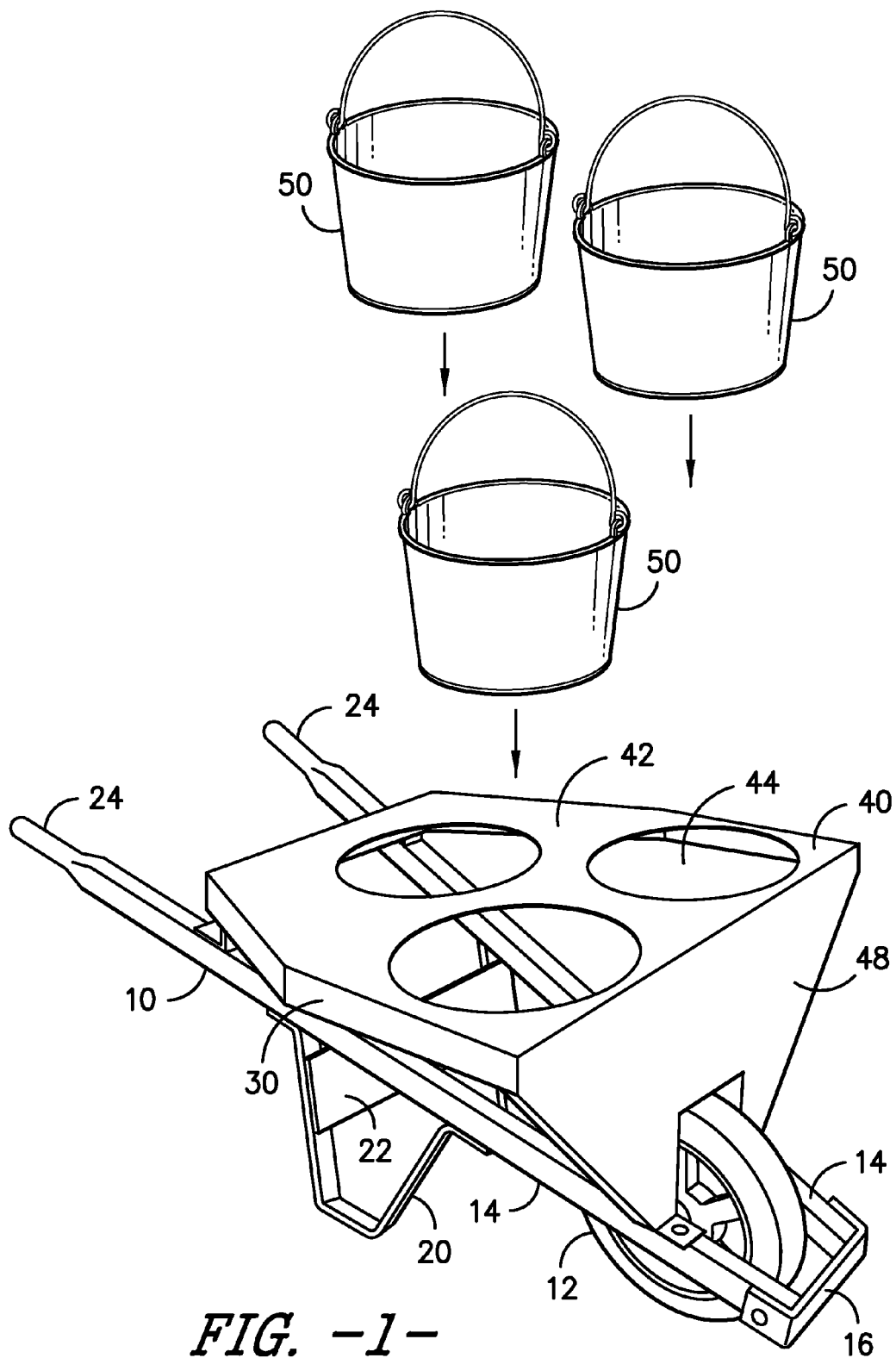
FIG. -1-

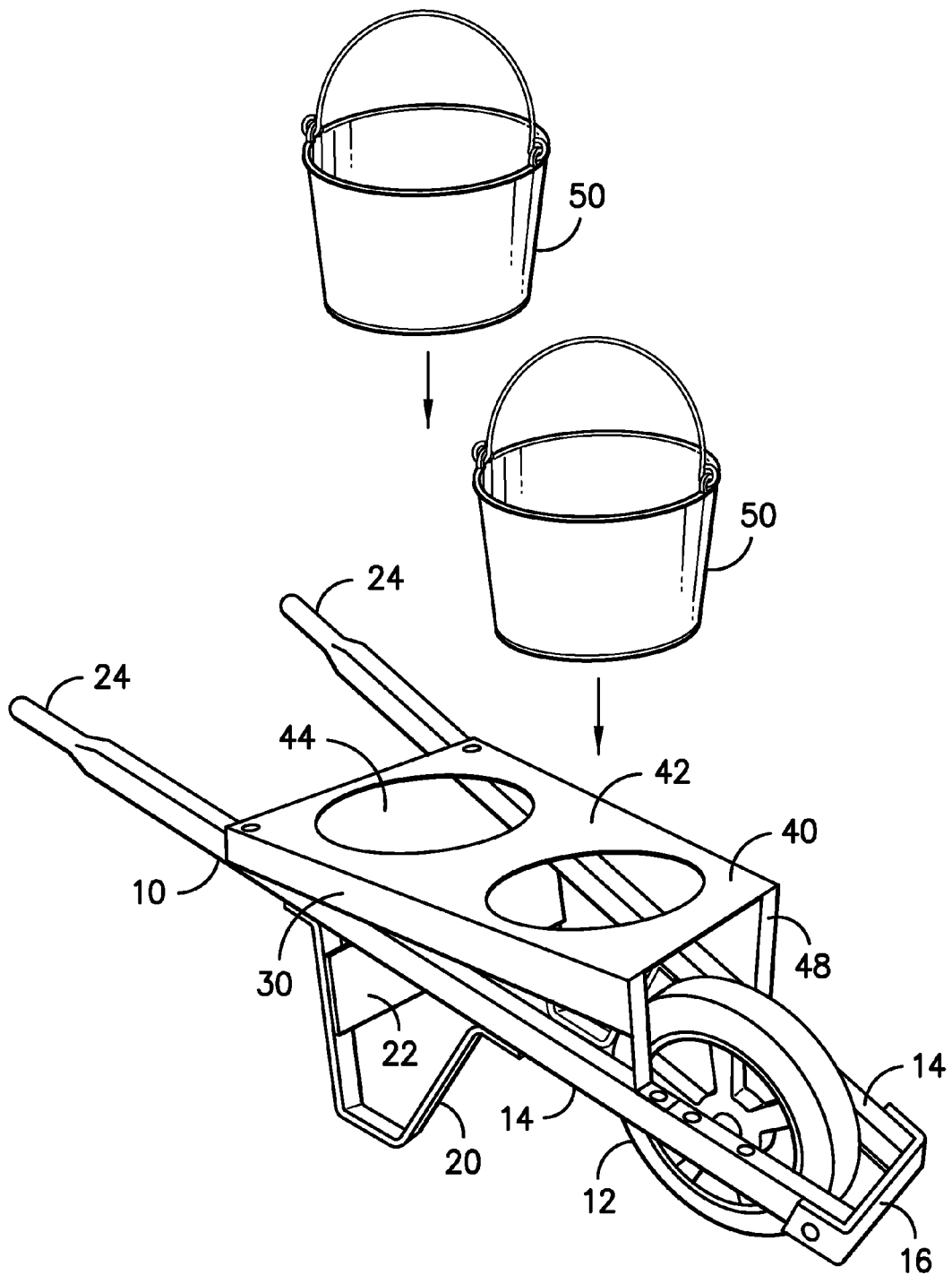
FIG. -2-

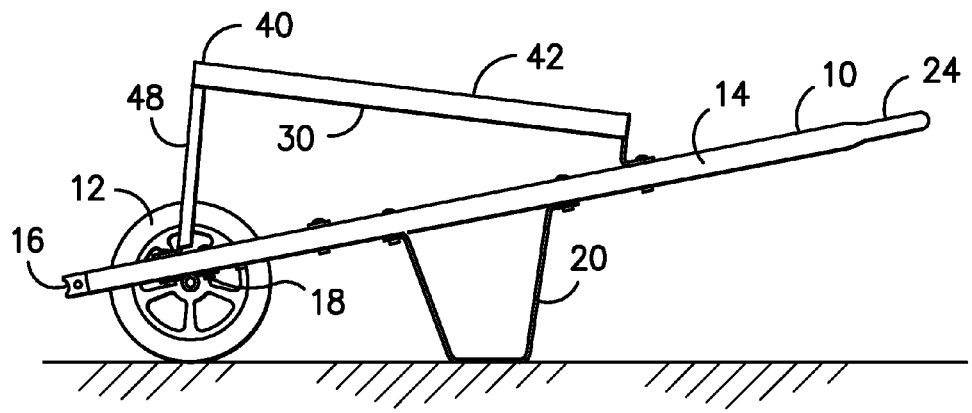
FIG. -3-
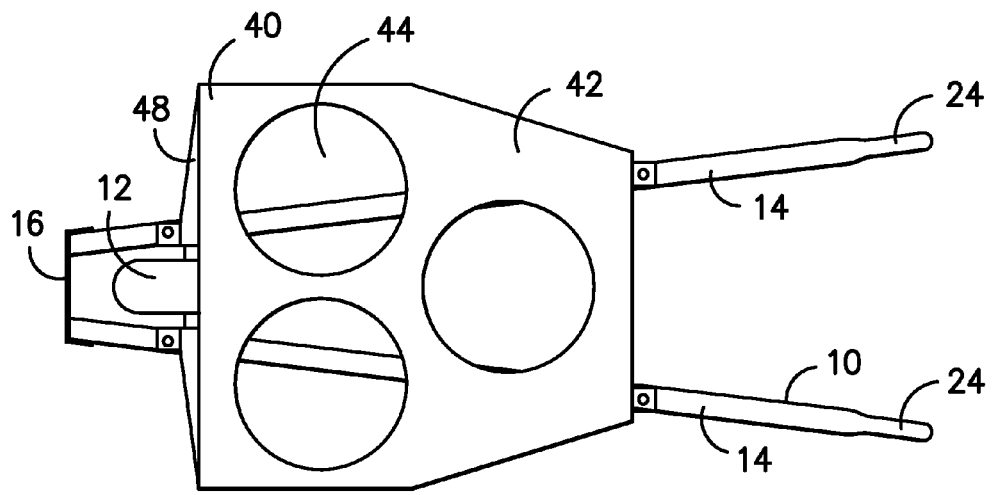
FIG. -4-

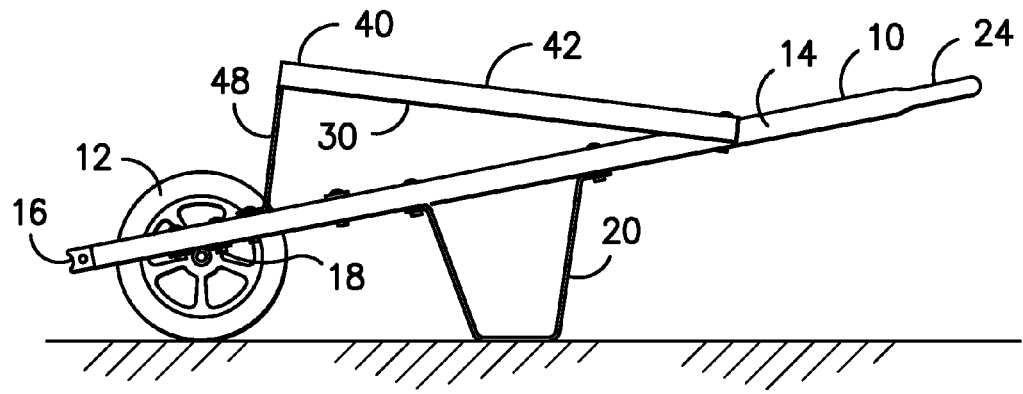
FIG. -5-
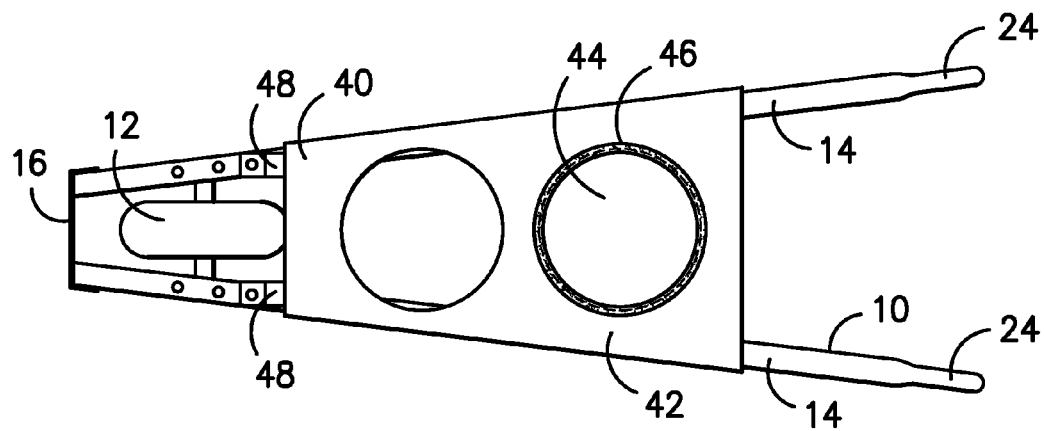
FIG. -6-

BUCKET TRANSPORT STRUCTURE

BACKGROUND OF THE INVENTION

The present invention relates generally to a wheelbarrow style structure for transporting buckets. More specifically, the present invention is directed to a simple novel structure for transporting buckets, wherein the structure includes a wheelbarrow frame together with a generally flat platform that defines one or more holes for receiving a bucket, which supports buckets in a roughly horizontal position during use and transport.

Wheelbarrows are useful items for transporting solid items of many sizes and shapes. However, conventional wheelbarrows are often ill-equipped for the transportation of liquids or buckets. For example, liquid materials tend to slosh and overflow the edges of the wheelbarrow during transport. This is particularly troublesome when traveling over bumpy or rough terrain. Buckets being transported in a conventional wheelbarrow have a tendency to slide and move around during transport. Further, while a conventional wheelbarrow may have a horizontal surface for loading the buckets, when in transport an angle is typically created that enhances the sliding and moving problem. Additionally, the angle created can cause further tendency towards spilling of the contents of the bucket or tipping of the bucket when in motion in conventional wheelbarrows. It is also particularly difficult to segregate materials within a conventional wheelbarrow. Very few advances to correct such problems have been posited.

Examples of devices designed to transport buckets and traverse the difficulties of conventional wheelbarrows include: U.S. Pat. No. 6,203,033 discloses a wheelbarrow for transporting circular buckets which includes a U-shaped bucket-support platform, consisting of rails, and two bucket confinement rings, consisting of tubes, which are supported by a U-shaped support tube. The combination of the platform, rings, and support tube is such that the structure supports the buckets from falling vertically and moving laterally. The structure is also such that the buckets are supported near the center line to prevent the wheelbarrow from tipping over.

U.S. Pat. No. 5,791,667 discloses a wheelbarrow with special compartments for containing individual buckets. The structures disclosed mostly consisting of a base platform for vertical support and some bucket confinement structure to prevent lateral movement, consisting of rails.

Several problems exist with these prior art devices. While each device may hold buckets in a relatively horizontal position when loading, the buckets are held at an angle when in transport. This angle enhances the chances of spilling a bucket's contents when in transport. Further, the assemblage of platforms and rings is rather complicated, and none of the prior art devices offer an interchangeability feature for accommodating differing numbers and sizes of buckets. Also, the prior art does not provide for interchangeability between the bucket support structure and a conventional wheelbarrow's single dish-like compartment. Therefore, there is a need for a simple, bucket transport structure which will hold buckets on a roughly horizontal level when in transport in one embodiment, and allow for a similar interchangeable structure to replace it to fulfill varying needs in sizes and amounts of buckets to be transported or the need for a conventional wheelbarrow in accordance with another embodiment.

BRIEF SUMMARY OF THE INVENTION

In accordance with one aspect of the invention, a bucket transport structure may include a wheelbarrow frame having a platform that defines one or more holes for receiving buckets in a roughly horizontal position during transport thereof. In one embodiment, the bucket transport structure may include, an integrally formed support platform with holes for insertion of buckets. The holes may optionally be lined with a rubber edge or sleeve for an easier and more secure fit. The platform, in one embodiment, may be secured to the frame by attachment near the front wheel of a wheelbarrow frame and, opposite the wheel, upon an upper portion of the frame near the handles so that an angle is created that will allow for the buckets to be disposed in a generally horizontal position during transport.

Having a platform that is removable and replaceable by another platform allows a user to choose from different configurations to accommodate different numbers or sizes of buckets. Further, a removable platform may replace or be replaced by a traditional single dish-like compartment to provide a conventional wheelbarrow assemblage. The platform being useful to various people in various areas, such as construction workers, warehouse personnel, gardeners, homeowners, farmers, and retail stores.

Further features of this invention will be apparent from the attached drawings and description of illustrative embodiments of the invention.

BRIEF DESCRIPTION OF THE DRAWINGS

These and other features, aspects, and advantages of the present invention will become better understood with regard to the following description, appended claims, and accompanying drawings where:

FIG. 1 is a side perspective view of one embodiment of the bucket support platform defining three holes with buckets separate but in condition for placement into the holes;

FIG. 2 is a side perspective view of another embodiment of the bucket support platform defining two holes with buckets separate but in condition for placement into the holes;

FIG. 3 is a side elevation view of one embodiment of the bucket transport structure defining three holes upon a level surface;

FIG. 4 is a top plan view of one embodiment of the bucket transport structure defining three holes;

FIG. 5 is a side elevation view of one embodiment of the bucket transport structure defining two holes upon a level surface; and FIG. 6 is a top plan view of one embodiment of the bucket transport structure defining three holes.

DETAILED DESCRIPTION OF THE INVENTION

FIGS. 1-6 illustrate a bucket transport structure, in accordance with various aspects of the present invention. The drawings depict a bucket support structure 40 adapted to support multiple buckets 50 connected to a wheelbarrow frame 10.

In one embodiment, the wheelbarrow frame 10 includes a wheel 12, rails 14 positioned on either side of the wheel 12, a front wheel guard 16 disposed between the rails 14, axle brackets 18 disposed on each rail 14 to connect and allow for rotation of the wheel 12, legs 20 extending beneath the rails 14, leg brace 22 extending between the rails 14, and each rail 14 includes a handle 24 at a distal end thereof. The rails 14 are disposed angularly, sloping upwardly from a front portion to the handles 24, as shown in FIGS. 1-3 and 5. Additionally, the rails 14 form an acute angle with respect to one another, so that the distance between the handles is greater than the distance between the front portions of the rails 14, as shown in FIGS. 1, 2, 4 and 6. In an alternate embodiment, the wheelbarrow frame 10 may include more than one wheel 12. The wheels 12 may be aligned side by side or in any suitable manner to facilitate use of the frame 10. The bucket support structure 40 may include a platform 42, which includes a generally flat upper surface that defines a series of holes 44, side members 30 extending downwardly from the upper surface, and a pair of platform supports 48 on a front portion thereof, extending downwardly for connection to the rails 14, as seen in FIG. 2. In an alternative embodiment, the bucket support structure 40 may include a single platform support 48, which may be formed by bending the material of the support structure 40 into an L-shape with one length consisting of the platform 42 and the other length consisting of the platform support 48, as seen in FIG. 1. The bucket support structure 40, is preferably integrally formed from a single piece construction. In a preferred embodiment, the platform 42 is disposed angularly, as seen in FIGS. 3 and 5, so that when the bucket transport structure is in transit, the platform 42 is disposed in a generally horizontal position. In such an angled configuration, when the bucket transport structure is at rest on a horizontal surface, the platform 42 is disposed at an angle from between about 9 degrees and about 15 degrees, tilted downwardly from front to rear (higher in front, lower in rear), although it is contemplated that other angles may be used, as desired.

The bucket support structure 40 may be made of metal, plastic, wood, or any other desired material. The platform may be constructed by injection molding or by manufacture in any other suitable manner.

Holes 44 are defined within the platform 42 in an arrangement that provides for the balance of the structure 40 and frame 10 to distribute the weight of the buckets evenly on either side of the wheel 12, particularly in transit. The platform 42 is preferably constructed of a shape to accommodate a number of holes 44 in an arrangement beneficial to the balance of the structure 40 and the frame 10, as shown in FIGS. 1, 2, 4, and 6. The holes 44 may optionally be lined with a rubber lining 46, in order to frictionally engage and secure the buckets 50 placed therein, as seen in FIG. 6. In a preferred embodiment the platform includes either two or three holes 44, although it is contemplated that the platform may include more than three bucket holes or one hole.

The platform 42 is preferably removably connected to the wheelbarrow frame 10 by at least one platform support 48 extending downwardly from a front portion of the platform, which connects the platform 42 and the rails 14. The platform 42, in a preferred embodiment, further may be removably connected on a rear portion to the rail 14, as shown in FIGS. 1, 2, 3, and 5.

In another embodiment, the platform includes three holes 44, as seen in FIGS. 1 and 4, and the shape of the platform 42 and the triangular position of the holes is designed to balance the weight of the buckets evenly on either side of the wheel, in order to provide balance for the structure 40 and the frame 10, particularly when in transit.

In a conventional construction, a dish-like compartment is removably connected to a frame, which includes a wheel 12. In a preferred embodiment of the present invention, the dish-like compartment of a conventional wheelbarrow may be replaced with a bucket support structure 40. Additionally, several platforms may be interchangeably attached to the frame 10, wherein, for instance, one platform 42 may include one hole 44 for a single bucket, a second platform 42 may include two holes 44 (preferably disposed in linear fashion, front to back), and a third platform may include three holes 44 in triangular fashion, as shown. A user may simply attach whichever platform 42 he or she wishes to use, depending on the number of buckets the user wishes to transport at any given time. It is also anticipated that the interchangeable platforms may also include holes 44 of different shapes to accommodate different containers.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A bucket transport structure comprising:
    an integrally formed first platform;
    said first platform defining at least one hole for receiving a bucket that may be inserted therein;
    a frame member attached to an underside of said first platform;
    said frame member including a pair of straight rails forming a handle at one end thereof and having at least one wheel rotatably attached therebetween adjacent a second end;
    a platform support extending downwardly from said first platform and attached to at least one of said straight rails; and
    said first platform having a rear end adjacent said handles and a front end adjacent said at least one wheel; and
    said first platform disposed angularly upwardly from said rear end to said front end in a range of 9 degrees to 15 degrees from horizontal when said bucket transport structure is at rest on an even surface.

2. The bucket transport structure set forth in claim 1, wherein said first platform defines a plurality of holes.

3. The bucket transport structure set forth in claim 1, wherein said rails are disposed angularly away from one another toward a rear portion of said rails, so that said rails are separated by a greater distance adjacent said handles than the distance between said rails adjacent said wheel.

4. The bucket transport structure set forth in claim 1, further including a rubber lining attached around a periphery of said hole.

5. The bucket transport structure out forth in claim 1, wherein said first platform is removably attached to said frame member.

6. The bucket transport structure set forth in claim 1, further including a second removable platform that may be attached to said frame member and used interchangeably with said first platform.

7. A bucket transport structure comprising:
    an integrally formed platform, said platform including a generally flat upper surface that defines at least one hole for receiving a bucket that may be inserted therein;
    said platform including a pair of side members extending downwardly from said upper surface, and further including a pair of platform supports extending downwardly from a front portion of said upper surface, wherein said platform supports include attachment means at a distal end thereof for removable attachment to a wheelbarrow frame;

said platform further including attachment means on a rear portion thereof for removable attachment to a wheelbarrow frame; and wherein said upper surface is disposed angularly upwardly from said rear portion to said front portion when said bucket transport structure is at rest on an even surface.

8. The bucket transport structure set forth in claim 7, wherein said upper surface defines a plurality of holes.

9. The bucket transport structure set forth in claim 7, further including a rubber gasket disposed about a periphery of said hole.

\* \* \* \* \*